US 6,658,213 B2

(12) United States Patent
Hayashi et al.

(10) Patent No.: US 6,658,213 B2
(45) Date of Patent: Dec. 2, 2003

(54) MODULATION CONTROLLING CIRCUIT

(75) Inventors: Akihiko Hayashi, Yokohama (JP);
Shinichiro Sano, Yokohama (JP);
Norio Nagase, Yokohama (JP);
Tomoyuki Otsuka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 333 days.

(21) Appl. No.: 09/768,696

(22) Filed: Jan. 24, 2001

(65) Prior Publication Data

US 2002/0018283 A1 Feb. 14, 2002

(30) Foreign Application Priority Data

Aug. 7, 2000 (JP) .......................... 2000-238012

(51) Int. Cl.[7] .......................... H04B 10/04; G02F 1/01; G02B 6/12
(52) U.S. Cl. .......................... 398/95; 359/279; 385/14; 385/122; 385/140; 250/227.12
(58) Field of Search .......................... 385/14, 122, 140; 250/227.12; 359/239, 279, 182, 183, 187, 132; 398/42, 68, 76, 93, 95

(56) References Cited

U.S. PATENT DOCUMENTS

| 5,170,274 A | * | 12/1992 | Kuwata et al. | 359/182 |
| 5,359,449 A | * | 10/1994 | Nishimoto et al. | 359/181 |
| 5,805,321 A | * | 9/1998 | Ooi et al. | 359/135 |
| 6,334,004 B1 | * | 12/2001 | Ohkuma et al. | 385/2 |

FOREIGN PATENT DOCUMENTS

JP 08-248365 9/1996

* cited by examiner

*Primary Examiner*—Evelyn Lester
(74) *Attorney, Agent, or Firm*—Katten Muchin Zavis Rosenman

(57) ABSTRACT

The invention relates to a modulation controlling circuit for supplying a modulating signal to an external modulator that outputs a modulated optical signal, while setting a proper operating point in the external modulator. The external modulator that operates in cooperation with the modulation controlling circuit of the invention enables high-quality modulation at a wide bit rate range. Therefore, in an optical transmission system or a measuring instrument to which the invention is applied, the characteristics and the performance are improved and the operation is made stable without loss of advantages of the external modulator.

18 Claims, 9 Drawing Sheets

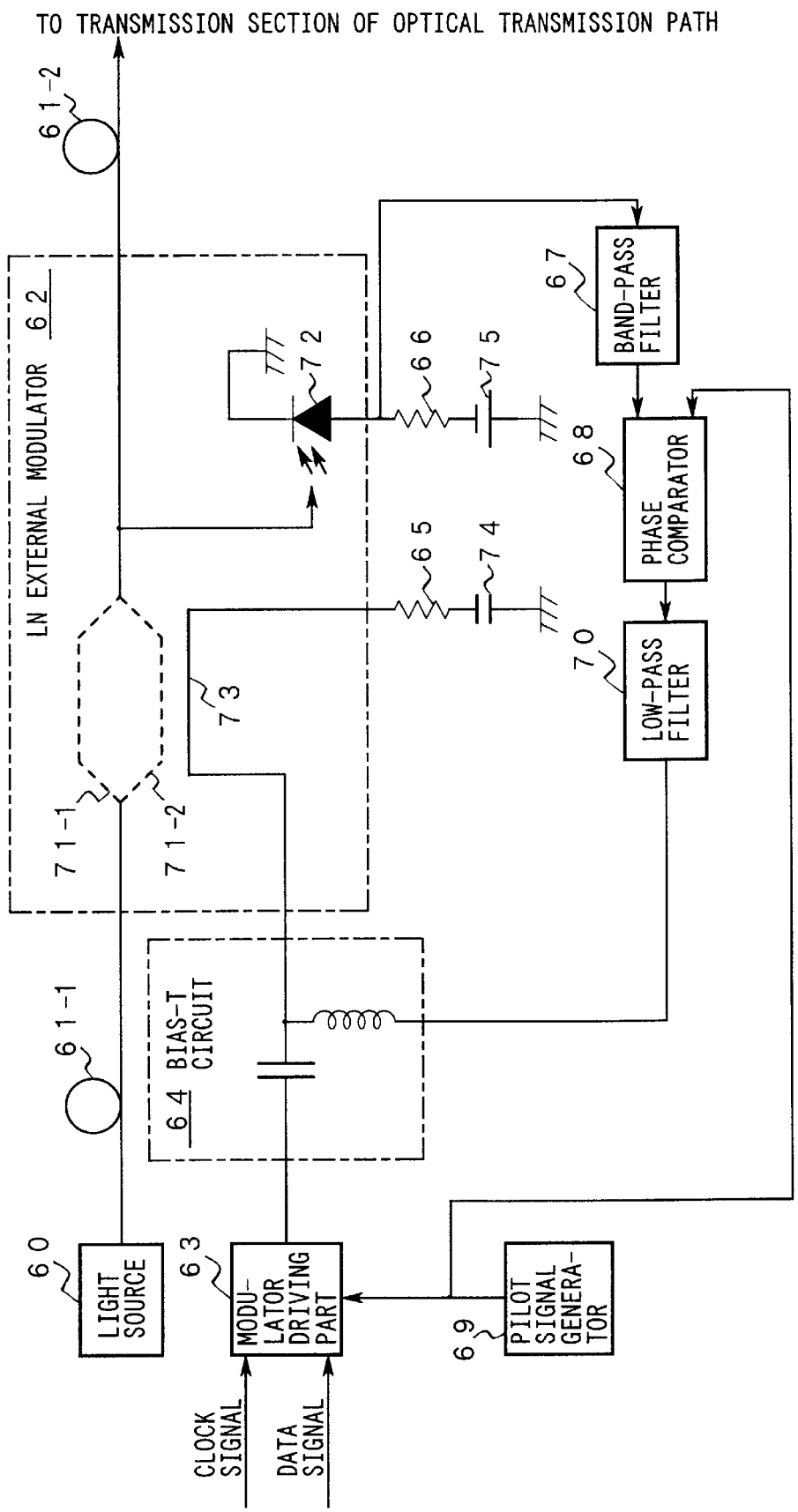

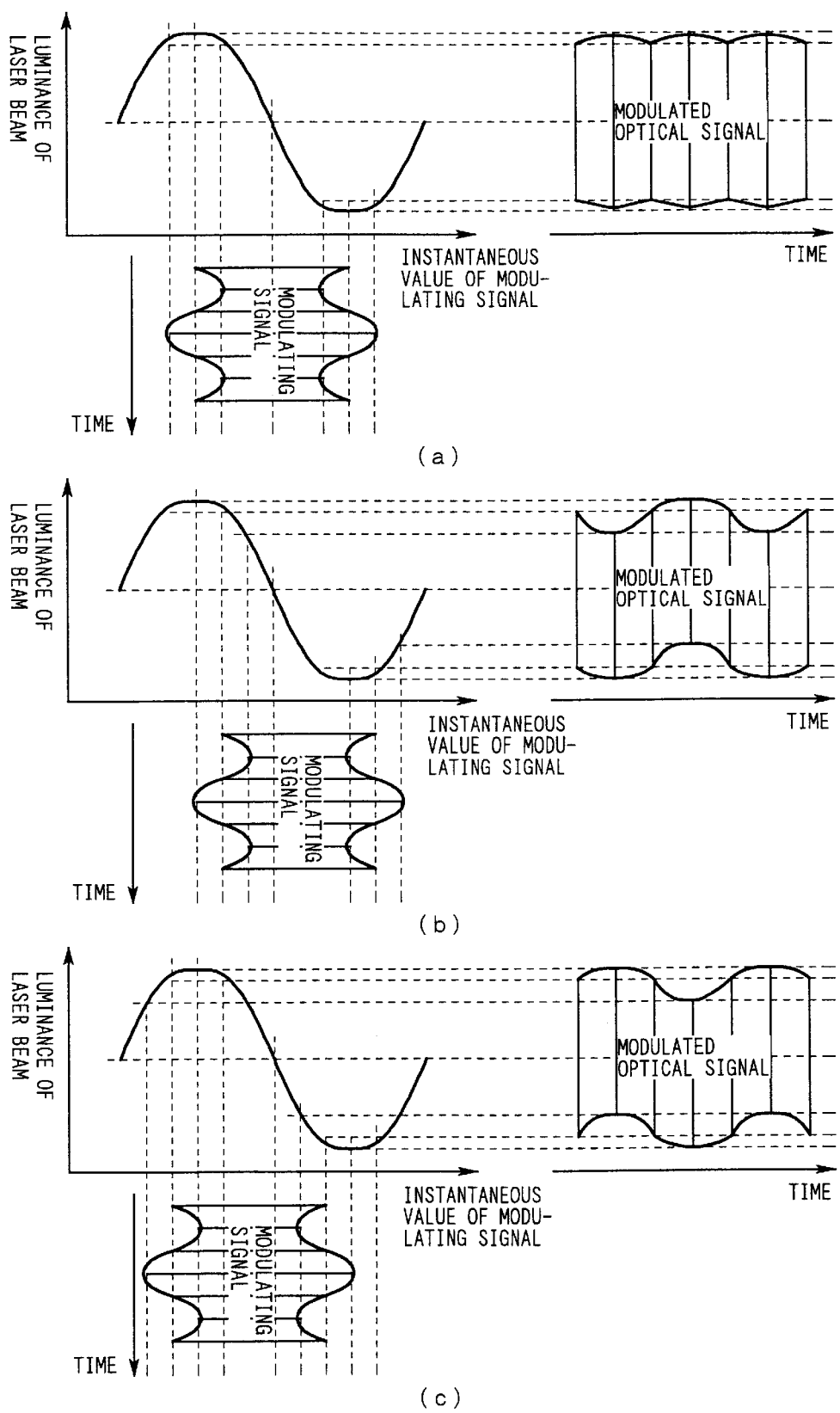

PRIOR ART   FIG. 8
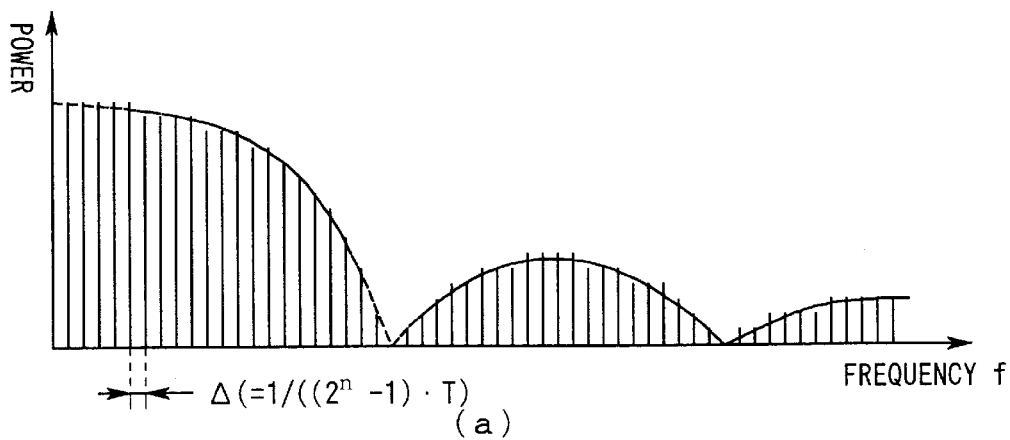
(a)
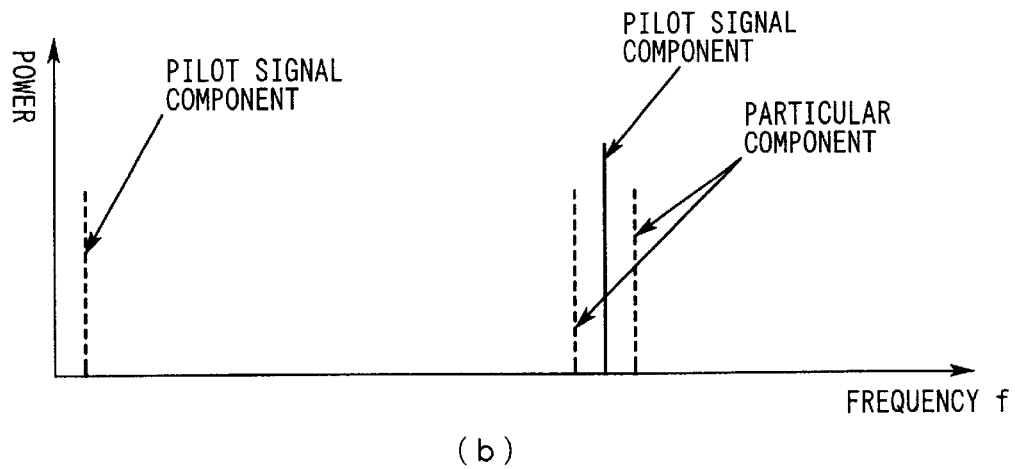
(b)

PRIOR ART  FIG. 9
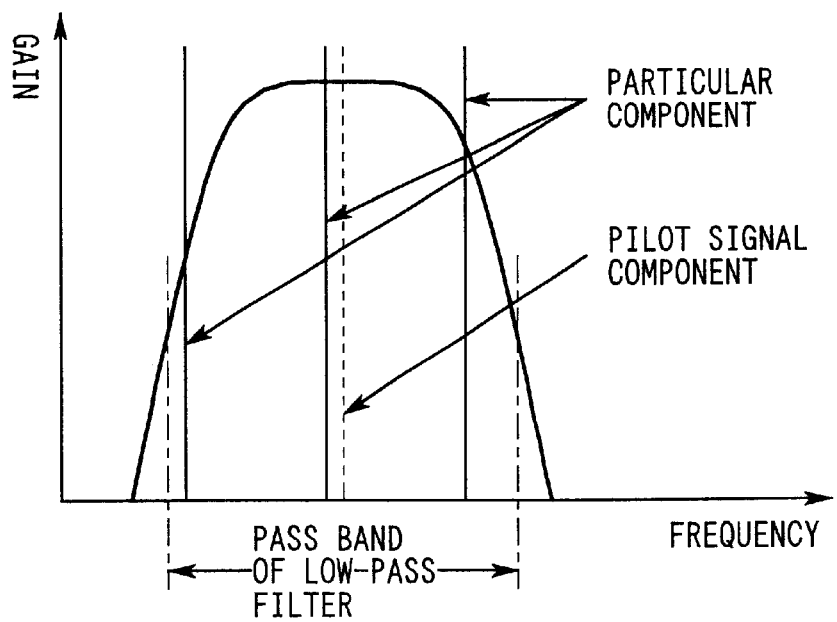
(a)
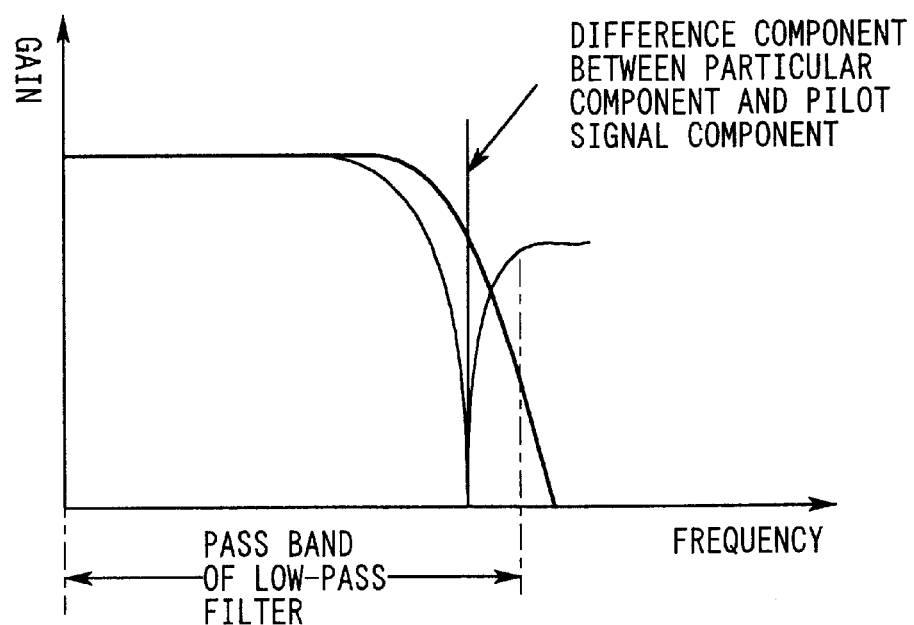
(b)

MODULATION CONTROLLING CIRCUIT

BACKGROUND OF THE INVENTION

1. Field of the Invention

The present invention relates to a modulation controlling circuit for supplying a modulating signal to an external modulator that outputs a modulated optical signal, while setting a proper operating point in the external modulator.

2. Description of the Related Art

In recent years, light sources such as the DFB laser having sharp wavelength selectivity and capable of adjusting the oscillation wavelength freely have been put into practical use and techniques of suppressing a spectrum variation due to dispersion characteristics and nonlinear effects that are specific to optical fibers have been applied to optical transmission systems.

The wavelength division multiplexing, which makes it possible to adjust to increase in the demand for services of multimedia, B-ISDN, etc. flexibly in an inexpensive manner, has come to be applied positively to trunk line systems of such optical transmission systems.

Therefore, to prevent spreading of an oscillation spectrum due to a phenomenon that the refractive index varies with the modulating current or temperature when a light source as mentioned above is modulated directly, an LN ($LiNbO_3$) external modulator, for example, is used in a transmitting part of a node apparatus of such a trunk line system.

FIG. 6 shows an example configuration of a transmitting part that incorporates an LN external modulator.

In FIG. 6, an exit aperture of a light source 60 is connected to an incidence aperture of an LN external modulator 62 via an optical fiber 61-1. An exit aperture of the LN external modulator 62 is connected to the immediate succeeding transmission section of an optical transmission path via an optical fiber 61-2. A data signal representing a sequence of transmission information and a clock signal that is synchronized with the transmission signal are input to first and second inputs of a modulator driving part 63, respectively. The output of the modulator driving part 63 is connected to one modulation input of the LN external modulator 62 via a bias-T circuit 64. The other modulation input of the LN external modulator 62 is grounded via a cascade connection of a resistor 65 and a capacitor 74. A monitoring terminal of the LN external modulator 62 is not only grounded via a cascade connection of a resistor 66 and a battery 75 but also connected to a first input of a phase comparator 68 via a band-pass filter 67. The output of a pilot signal generator 69 is connected to a second input of the phase comparator 68 and a third input of the modulator driving part 63. The output of the phase comparator 68 is connected to a bias terminal of the bias T-circuit 64 via a low-pass filter 70.

The LN external modulator 62 is composed of the following components:

Two optical waveguides 71-1 and 71-2 that are formed parallel between the incidence aperture and the exit aperture.

A photodiode 72 that is in weak optical coupling with the exit aperture, whose cathode is grounded, and whose anode is connected to the above-mentioned monitoring terminal.

A waveguide length varying part 73 for varying the difference between the optical waveguide lengths of the respective optical waveguides 71-1 and 71-2 in accordance with a current flowing between the above-mentioned first and second inputs.

In the transmitting part having the above configuration, the pilot signal generator 69 generates a pilot signal (for simplicity, it is assumed to be a sine wave having a frequency of 1 kHz) constantly. The modulator driving part 63 generates an NRZ signal by sampling, in synchronization with the clock signal, a bit string that is given as the above-mentioned data signal, and generates a modulating signal by amplitude-modulating the NRZ signal in accordance with the instantaneous value of the pilot signal.

On the other hand, in the LN external modulator 62, a laser beam that is emitted from the light source 60 and supplied via the optical fiber 61-1 is branched once by the optical waveguides 71-1 and 71-2, then recombined, and finally output to the immediate succeeding transmission section of the optical transmission path via the optical fiber 61-2.

The difference between the optical waveguide lengths of the respective optical waveguides 71-1 and 71-2 is given as a periodic function corresponding to the sine of the instantaneous value of the modulating signal that is supplied from the modulator driving part 63 via the bias T-circuit 64.

That is, the luminance of a laser beam that is output to the above-mentioned immediate succeeding transmission section via the optical fiber 61-2 (for simplicity, hereinafter referred to simply as "outgoing beam") is amplitude-modulated so as to have opposite phases in periods when the NRZ signal included in the modulating signal has logical values "1" and "0" respectively, in a state that the operating point of the LN external modulator 62 (waveguide length varying part 73) is set properly as shown in FIG. 7A.

However, for example, in a state that the operating point of the LN external modulator 62 (waveguide length varying part 73) is not set at a proper point as shown in FIG. 7B or 7C, the luminance of an outgoing beam has phases that depend on the offset of the operating point and is given as a function of time on which the pilot signal is superimposed.

The photodiode 72 outputs a monitoring signal that represents the luminance of such an outgoing beam in the form of an instantaneous value. The band-pass filter 67 extracts the pilot signal component from the components of the monitoring signal.

The phase comparator 68 compares the phases of this pilot signal component and the pilot signal as generated by the pilot signal generator 69 and generates an error signal that indicates the difference between the two pilot signals in the forms of an instantaneous value.

The low-pass filter 70, which has a passband that is lower than the frequency of the two pilot signals, feeds back (negatively) a component of the error signal that passes through the low-pass filter 70 to the LN external modulator 62 via the bias T-circuit 64.

In other words, even if the operating environment such as the temperature varies, the operating point of the LN external modulator 62 (waveguide length varying part 73) is kept proper in a stable manner and hence the transmission quality is kept high.

In many optical transmission systems of the above conventional example, the data signal is given as the product of a PN series that is used for, for example, securing confidentiality and a bit string that represents transmission information.

Therefore, a frequency spectrum of the modulating signal has a line spectrum (see FIG. 8A) whose envelope component is given by a function E(f) of frequency f that is represented by the following Equation (1) and whose interval Δ on the frequency axis is represented by the following Equation (2) in a case where, for example, the number of stages of a shift register used for generation of the PN series is n and the period of the clock signal (i.e., the reciprocal of the bit rate of the transmission information) is T:

$$E(f)=(\sin \pi fT/\pi fT)^2 \quad (1)$$

$$\Delta=1/\{(2^n-1)T\} \quad (2)$$

That is, the interval $\Delta$ has a smaller value when the bit rate of the transmission information (i.e., the frequency of the clock signal) is smaller.

Therefore, where the bit rate is as large as 10 Gbits/sec, for example, the probability that a component (hereinafter referred to simply as "particular component") of the line spectrum that is closest to the pilot signal component on the frequency axis exists in the passband of the band-pas filter 67 is very low (see FIG. 8B) and the probability that a difference component between the particular component and the pilot signal component on the frequency axis exist in the passband of the low-pass filter 70 is also low.

However, where the bit rate is as low as 155 Mbits/sec, for example, it is highly probable that the particular component of a line spectrum as mentioned above exists in the passband of the band-pass filter 67 and that a difference component between the particular component and the pilot signal component exists in the passband of the low-pass filter 70 (see FIGS. 9A and 9B).

Therefore, depending on the combination of the above-mentioned bit rate and the frequency of the pilot signal (sine wave), the feedback control system formed by the band-pass filter 67, the phase comparator 68, the low-pass filter 70, and the bias T-circuit 64 between the monitoring terminal and the first input of the LN external modulator 62 may not be able to keep the operating point of the LN external modulator 62 at a proper point. Further, limitations may be imposed on the operation environment such as the temperature and desired high transmission quality may not be obtained in a stable manner.

For example, a proper operating point can be obtained in a stable manner by establishing a proper combination of the bit rate and the frequency of the pilot signal.

However, in practice, there occur cases where it is difficult to set the frequency of the pilot signal at a proper value due to the following technical limitations:

To prevent induced noise due to the use of a commercial power supply and to make the response speed of the above-described feedback control system at a value suitable for practical use, it is desirable that the frequency of the pilot signal be higher than that of the commercial power supply (50 or 60 Hz) by one order or more.

Where high-density assembling is required in surface mounting, the frequency of the pilot signal should be so high that hardware can be constructed by using small parts that enable such mounting.

To attain desired transmission quality even with turbulence of waveforms such as a minimum frequency component of the modulating signal and a sag that may accompany the waveform of the modulating signal, it is desirable that the frequency of the pilot signal be lower than several tens of kiloheltz by about one order.

As for the above-mentioned bit rate, in recent years, in particular, optical transmission systems to which the wavelength division multiplexing is applied have come to be required to flexibly adapt to a wide transmission rate range of 155.52 Mbits/sec to 9.953 Gbits/sec, for example, as in the case of "bit select" and "bit free." Therefore, it is difficult to change the bit rate in practice though possible technically.

For example, the following methods are available as methods for obtaining a proper operating point in a stable manner.

Setting the passband width of one or both of the band-pass filter 67 and the low-pass filter 70 as narrow as possible.

Sharpening the filtering characteristic at the boundary between the passband and the rejection band of each of the above filters and increasing the accuracy of frequency and the stability of the pilot signal and the clock signal.

However, it is difficult to implement the above methods, because those methods increase the circuit scales of the band-pass filter 67 and the low-pass filter 70 and it is necessary to use, as an oscillator to provide a frequency reference to be used in generating the pilot signal and the clock signal, an expensive high-stability crystal oscillator capable of stable operation independent from the environmental changes but large in physical size.

In summary, in the conventional example, since noise having a frequency equal to the difference between the frequencies of the pilot signal and the component of the above-mentioned line spectrum that is closest to the pilot signal on the frequency axis can be superimposed on the error signal, the extinction ratio of an optical signal output from the LN external modulator 62 lowers, which may degrade the transmission quality and disable desired wide-band transmission.

SUMMARY OF THE INVENTION

An object of the present invention is to provide a modulation controlling circuit capable of high-quality modulation in a wide bit rate range without substantially altering the basic hardware configuration and scale.

Another object of the invention is to stably keep the operating point of an external modulator at a proper operating point under a feedback control.

Another object of the invention is to promptly start an external modulator and keep its operation with stability at a proper operating point even where it requires a long time to place a filtering unit into a stationary state at its startup.

Another object of the invention is to keep the operating point of an external modulator at a proper point with stability and high accuracy.

Still another object of the invention is to keep the operating point of an external modulator at a proper operating point with stability even in a case where phase values of transmission information and a clock signal to be synchronized with the transmission information varies or the bit rate of the transmission information varies.

Another object of the invention is to simplify in configuration and reduce in scale one or both of the hardware and software of a filtering unit.

A further object of the invention is to stably keep the operating point of an external modulator at a proper operating point even where the bit rate of a sequence of transmission information is extremely low or a bit pattern given as a sequence of the transmission information may variously changes.

Another object of the invention is to keep the operating point of an external modulator at a proper operating point with stability even if an environmental condition such as a power supply voltage or the temperature varies.

Another object of the invention is to stably keep the operating point of an external modulator at a proper operating point without an increase in hardware scale or complication in hardware configuration even if a filtering unit is provided.

Another object of the invention is to heighten the response speed at the startup irrespective of filtering characteristics to be attained by a filtering unit within a stationary period.

Still another object of the invention is to heighten the response speed at the startup without complicating the hardware or software configuration.

Yet another object of the invention is to heighten the response speed without altering the basic hardware configuration in a case where a filtering unit performs filtering according to stored logic.

A further object of the invention is to improve and keep the characteristics and performance of an external modulator in an optical transmission system or a measuring instrument to which the invention is applied without losing advantages.

The invention provides a modulation controlling circuit comprising a feedback path for setting the operating point of an external modulator at a point where a phase difference between a first pilot signal superimposed on a modulating signal and a second pilot signal to be superimposed on an optical signal output from the external modulator according to the modulating signal is suppressed; and a filtering unit for suppressing components of the modulating signal that may exist in the passband of the feedback path according to turbulence of waveforms of the modulating signal.

In this modulation controlling circuit, the operating point of the external modulator can be stably kept at a proper operating point under the feedback control performed via the feedback path.

The invention provides a modulation controlling circuit comprising a unit for setting the operating point of an external modulator at a reference operating point, feeding back a phase difference as a representative of an error of the operating point to the reference operating point via a feedback path, and refraining from feeding back the phase difference until being placed into a stationary state at the startup.

In this modulation controlling circuit, the external modulator promptly starts its operation and stably operates at a proper operating point even where it requires a long time to place the filtering unit into a stationary state.

The above object is achieved by the modulation controlling circuit where a pilot signal superimposed on a modulating signal is extracted from the modulating signal to employ it as the first pilot signal.

In this modulation controlling circuit, the operating point of the external modulator is kept at a proper operating point with stability and high accuracy.

The above object is achieved by the modulation controlling circuit where at the startup the operating point of the external modulator is maintained at a reference operating point and within the stationary state an operating point in replace of the reference operating point is maintained under the feedback control.

In this modulation controlling circuit, the external modulator promptly starts its operation and stably operates at a proper operating point even in a case where it requires a long time to place a filtering unit into a stationary state.

The above objects are achieved by the modulation controlling circuit where the first pilot signal is supplied in synchronization with a sequence of transmission information to be given as a modulating signal.

In this modulation controlling circuit, it is possible to stably keep the operating point of the external modulator at a proper operating point even in a case where the phases values of the transmission information and the clock signal to be synchronized with the transmission information varies or the bit rate of the transmission information varies.

The above objects are achieved by the modulation controlling circuit where the cut-off frequency of the filtering unit is set at a value lower than the minimum frequency in the occupied band of the modulating signal and the passband of the filtering unit is set lower than the cut-off frequency.

The modulation controlling circuit realizes simplification in configuration and reduction in scale of one or both of the hardware and software of the filtering unit.

The above objects are attained by the modulation controlling circuit where the filtering unit suppresses the components of the modulating signal that may exist in the passband of the feedback path when a length of a period where a logical value of the modulating signal is kept at a constant value is at maximum.

In this modulation controlling circuit, even in a case where the bit rate of a sequence of transmission information is extremely low or a bit pattern given as a sequence of transmission information can variously changes, the operating point of the external modulator is stably kept at a proper operating point.

The above objects are achieved by the modulation controlling circuit where the filtering unit has such a wide bass band that it is possible to maintain an operating point by feedback via the feedback path at a maximum variation speed of the operating point of the external modulator.

In this modulation controlling circuit, the operating point of the external modulator is kept at a proper operating point with stability even when an environmental condition such as a power supply voltage or the temperature varies.

The above objects are achieved by the modulation controlling circuit where the filtering unit is constituted as a non-recursive digital filter.

In this modulation controlling circuit, the operating point of the external modulator is kept at a proper operating point with stability without an increase in scale or complication in configuration of the hardware.

The above objects are achieved by the modulation controlling circuit where the time constant of the feedback path is kept at a small value within a predetermined period at the startup.

The modulation controlling circuit makes it possible to heighten the response speed of at the startup irrespective of filtering characteristics to be attained by the filtering unit during a stationary period.

The above objects are attained by the modulation controlling circuit where the interval at a small value in time series to be a reference of the filtering is maintained at a small value within a predetermined period at the startup.

The modulation controlling circuit makes it possible to heighten the response speed at the startup without complicating the hardware or software configuration.

The above objects are achieved by the modulation controlling circuit where one or both of the number of operands of the filtering and the accuracy of the operands are maintained at a small value within a predetermined period at the startup.

In this modulation controlling circuit, it is possible to heighten the response speed at the startup without altering the basic hardware configuration when the aforementioned filtering is performed according to stored logic.

BRIEF DESCRIPTION OF THE DRAWINGS

The nature, principle, and utility of the invention will become more apparent from the following detailed description when read in conjunction with the accompanying drawings in which like parts are designated by identical reference numbers, in which:

FIG. 6 shows an example configuration of a transmitting part that incorporates an LN external modulator;

FIGS. 7A to 7C show responses of the LN external modulator for three different operating points; and FIGS. 8A and 8B and FIGS. 9A and 9B show problems of the conventional example.

DESCRIPTION OF THE PREFERRED EMBODIMENTS

The principle of operation of each modulation controlling circuit according to the present invention will be described below with reference to a block diagram of FIG. 1.

Figure 1:
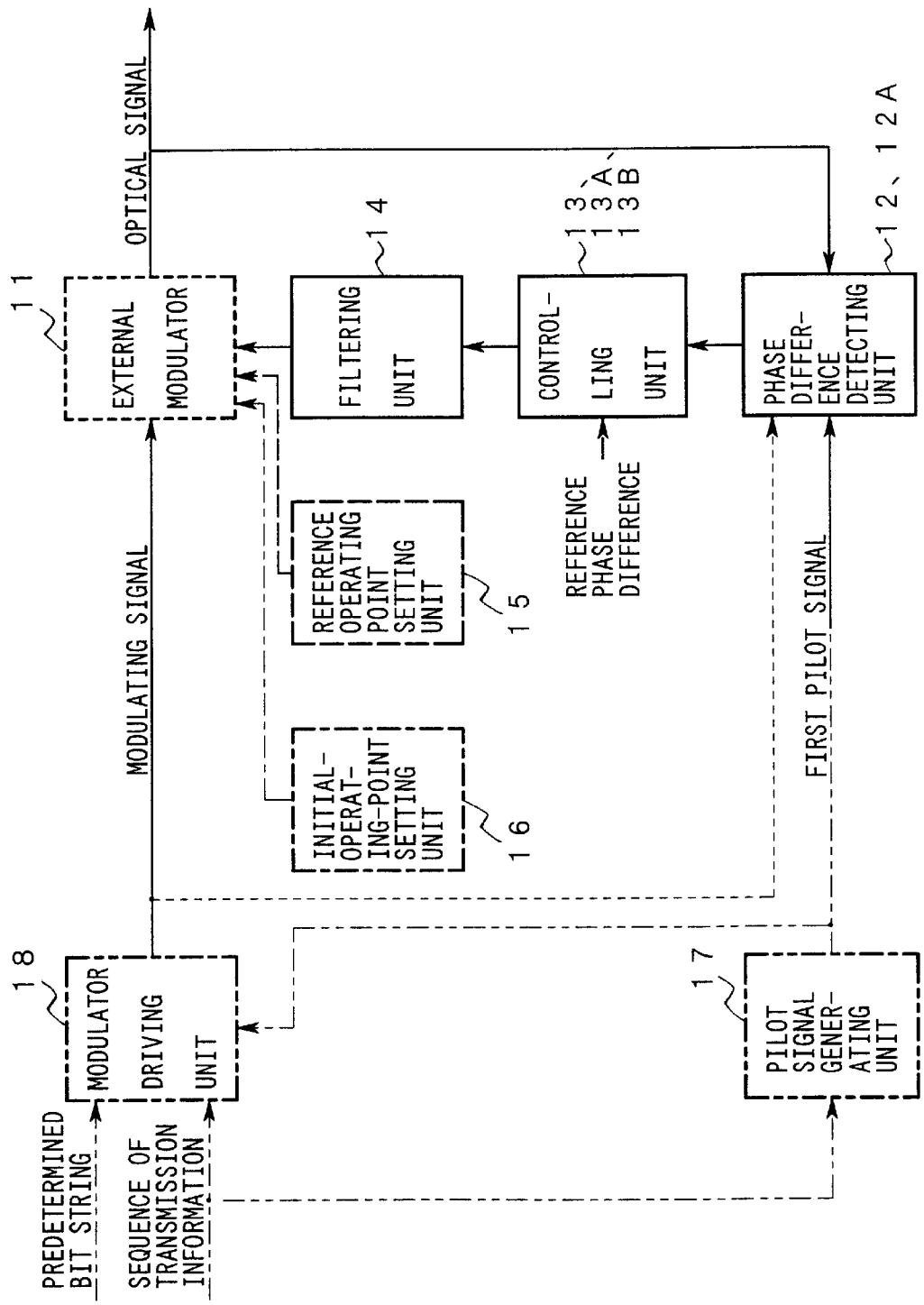
FIG. 1 is a block diagram showing the principle of operation of each modulation controlling circuit according to the present invention.

Each modulation controlling circuit of FIG. 1 is composed of a phase difference detecting unit 12 or 12A that cooperates with an external modulator 11, a controlling unit 13, 13A, or 13B, a filtering unit 14, a reference operating point setting unit 15, an initial operating point setting unit 16, a pilot signal generating unit 17, and a modulator driving unit 18.

The principle of operation of a first modulation controlling circuit according to the invention is as follows.

The phase-difference detecting unit 12 detects a phase difference between a first pilot signal superimposed or to be superimposed on a modulating signal and a second pilot signal superimposed on an optical signal output from the external modulator 11 according to the modulating signal. The controlling unit 13 feeds back the phase difference to the external modulator 11 and average it to keep the operating point of external modulator 11 at a point where the phase difference detected by the phase difference detecting unit 12 is suppressed. The filtering unit 14, which is provided in a feedback path of the above feedback, suppresses components of the modulating signal that may exist in the passband of the feedback path according to turbulence of waveforms of the modulating signal.

In the modulation controlling circuit having the above configuration, the phase difference is fed back at a large SN ratio to the external modulator 11 via the feedback path irrespective of frequency spectrum distribution of the modulating signal, as long as the filtering unit 14 has a rejection band or an attenuation pole suitable for the frequency spectrum distribution.

Therefore, the operating point of the external modulator 11 can be stably kept at a proper point under the feedback control performed by the filtering unit 14 in cooperation with the controlling unit 13.

The principle of operation of a second modulation controlling circuit according to the invention is as follows.

The phase-difference detecting unit 12 detects a phase difference between a first pilot signal superimposed or to be superimposed on a modulating signal and a second pilot signal superimposed on an optical signal output from the external modulator 11 according to the modulating signal. The reference operating point setting unit 15 sets the operating point of the external modulator 11 at a reference operating point. The controlling unit 13A keeps the operating point of the external modulator 11 at a point where the phase difference detected by the phase difference detecting unit 12 is suppressed by feeding back, to the external modulator 11, the difference between the phase difference and a reference phase difference corresponding to the reference operating point. The filtering unit 14, which is provided in a feedback path of the above feedback, suppresses components of the modulating signal that may exist in the passband of the feedback path according to turbulence of waveforms of the modulating signal. The controlling unit 13A refrains from feeding back the difference to the external modulator 11 until starting a stationary operation at its startup.

In the modulation controlling circuit having the above configuration, immediately after the startup, the operating point of the external modulator 11 is set by the reference operating point setting unit 15. Within a stationary operation period, irrespective of frequency spectrum distribution of the modulating signal, the operating point of the external modulator 11 is kept at a proper operating point under the feedback control performed at a large SN ratio by the controlling unit 13A in cooperation with the filtering unit 14.

Therefore, even in a case where it requires a long time to place the filtering unit 14 into a stationary state, the external modulator 11 promptly starts an operation and operates stably at a proper operating point.

The principle of operation of a third modulation controlling circuit according to the invention is as follows.

The phase-difference detecting unit 12A detects a phase difference between a first pilot signal superimposed on a modulating signal and a second pilot signal superimposed on an optical signal output from the external modulator 11 according to the modulating signal. The controlling unit 13B feeds back the phase difference to the external modulator 11 to keep the operating point of the external modulator 11 at a point where the phase difference detected by the phase difference detecting unit 12 is suppressed.

Since the phase of the first pilot signal is kept approximately the same as that of the pilot signal actually superimposed on the modulating signal, it does not have an error even where the characteristics of a unit for superimposing the pilot signal on the modulating signal varies or has a deviation.

Therefore, the operating point of the external modulator 11 is kept at a proper point with stability and high accuracy.

The principle of operation of a fourth modulation controlling circuit is as follows.

The initial-operating-point setting unit 16 keeps an operating point where a reference phase difference in replace of the phase difference to be fed back by the controlling unit 13 is suppressed, until the controlling unit 13 begins a stationary operation at its startup. The controlling unit 13 refrains from feeding back the phase difference to the external modulator 11 until beginning a stationary operation at the startup.

In the modulation controlling circuit having the above configuration, immediately after the startup, the operating point of the external modulator 11 is set by the initial operating point setting unit 16. Within a stationary operation period, irrespective of frequency spectrum distribution of the modulating signal, the operating point of the external modulator 11 is kept at a proper point under the feedback control performed at a large SN ratio by the controlling unit 13 in cooperation with the filtering unit 14.

Therefore, even where it requires a long time to place the filtering unit 14 into a stationary state, the external modulator 11 promptly starts and keeps its operation at a proper operating point with stability.

The principle of operation of a fifth modulation controlling circuit according to the invention is as follows.

The pilot signal generating unit 17 generates the first pilot signal synchronized with a sequence of transmission information. The modulator driving unit 18 generates the modulating signal by multiplying the sequence of transmission information by a predetermined bit string, and superimposing the first pilot signal as the resulting product to supply the generated modulating signal to the phase difference detecting unit 12 and the external modulator 11.

In the modulation controlling circuit having the above configuration, the operating point of the external modulator 11 is stably kept at a proper operating point even where the phase difference between the transmission information and the clock signal to be synchronized with the transmission information varies or the bit rate of the transmission information varies.

The principle of operation of a sixth modulation controlling circuit according to the invention is as follows.

The cut-off frequency of the filtering unit 14 is set at a value lower than the minimum frequency in the occupied band of the modulating signal, and the passband of the filtering unit 14 is set lower than the cut-off frequency.

In the modulation controlling circuit having the above configuration, the filtering unit 14 is formed so as not to have a sharp attenuation pole at frequencies where the components of the modulating signal exist in the passband of the feedback path.

Therefore, it is possible to simplify in configuration and reduce in scale one or both of the hardware and the software of the filtering unit 14.

The principle of operation of a seventh modulation controlling circuit according to the invention is as follows.

The filtering unit 14 suppresses the components of the modulating signal that may exist in the passband of the feedback path when a length of period where the logical value of the modulating signal can be kept at a constant value is at maximum.

In the modulation controlling circuit having the above configuration, even in a case where the bit rate of a sequence of transmission information is extremely low or a bit pattern given as a sequence of transmission information can vary in a variety of forms, the operating point of the external modulator 11 is kept at a proper point with stability.

The principle of operation of an eighth modulation controlling circuit according to the invention is as follows.

The filtering unit 14 has such a wide bass band that it is possible to maintain an operating point by feedback via the feedback path at a maximum variation speed of the operating point of the external modulator 11.

In the modulation controlling circuit having the above configuration, the operating point of the external modulator 11 is kept at a proper operating point with stability even when an environmental condition such as a power supply voltage or the temperature varies.

The principle of operation of a ninth modulation controlling circuit according to the invention is as follows.

The filtering unit 14 is constituted as a non-recursive digital filter.

In the modulation controlling circuit having the above configuration, a recursive calculation is not performed in the filtering processing of the filtering unit 14. Therefore, the filtering characteristic is kept stable and a transient response promptly completes within a predetermined period at the startup irrespective of the values of operands.

Therefore, the operating point of the external modulator 11 is kept at a proper operating point with stability without increasing the hardware scale or complicating the hardware configuration even when the filtering unit 14 is provided.

The principle of operation of a tenth modulation controlling circuit according to the invention is as follows.

The controlling unit 13 or 13A sets the time constant of the feedback path at a small value within a predetermined period at its startup.

In the modulation controlling circuit having the above configuration, after starting its operation the operating point of the external modulator 11 promptly transfers from a transient state to a stationary state.

This makes it possible heighten the response speed at the startup irrespective of the filtering characteristics to be attained by the filtering unit 14 in a stationary state.

The principle of operation of an eleventh modulation controlling circuit according to the invention is as follows.

The filtering unit 14 performs filtering in the digital domain. The controlling unit 13 or 13A sets the interval at a small value in time series to be a reference of the filtering, within a predetermined period at the startup.

In the modulation controlling circuit having the above configuration, after starting its operation, the operating point of the external modulator 11 promptly transfers to a stationary operating point without altering the calculation procedure or the operands of the filtering to be performed by the filtering unit 14.

Therefore, the response speed at the startup can be heightened without complicating the hardware or software configuration.

The principle of operation of a twelfth modulation controlling circuit according to the invention is as follows.

The filtering unit 14 performs filtering in the digital domain. The controlling units 13 or 13A sets one or both of the number of operands of the filtering and the precision of the operands at a small value within a predetermined period at the startup.

In the modulation controlling circuit having the above configuration, after starting its operation, the operating point of the external modulator 11 promptly transfers to a stationary operating point without altering the interval in time series to be a reference of the filtering.

Therefore, when the filtering 14 is performed according to stored logic, the response speed at the start up is heightened without altering the basic hardware configuration.

Embodiments of the invention will be hereinafter described in detail with reference to drawings.

Figure 2:
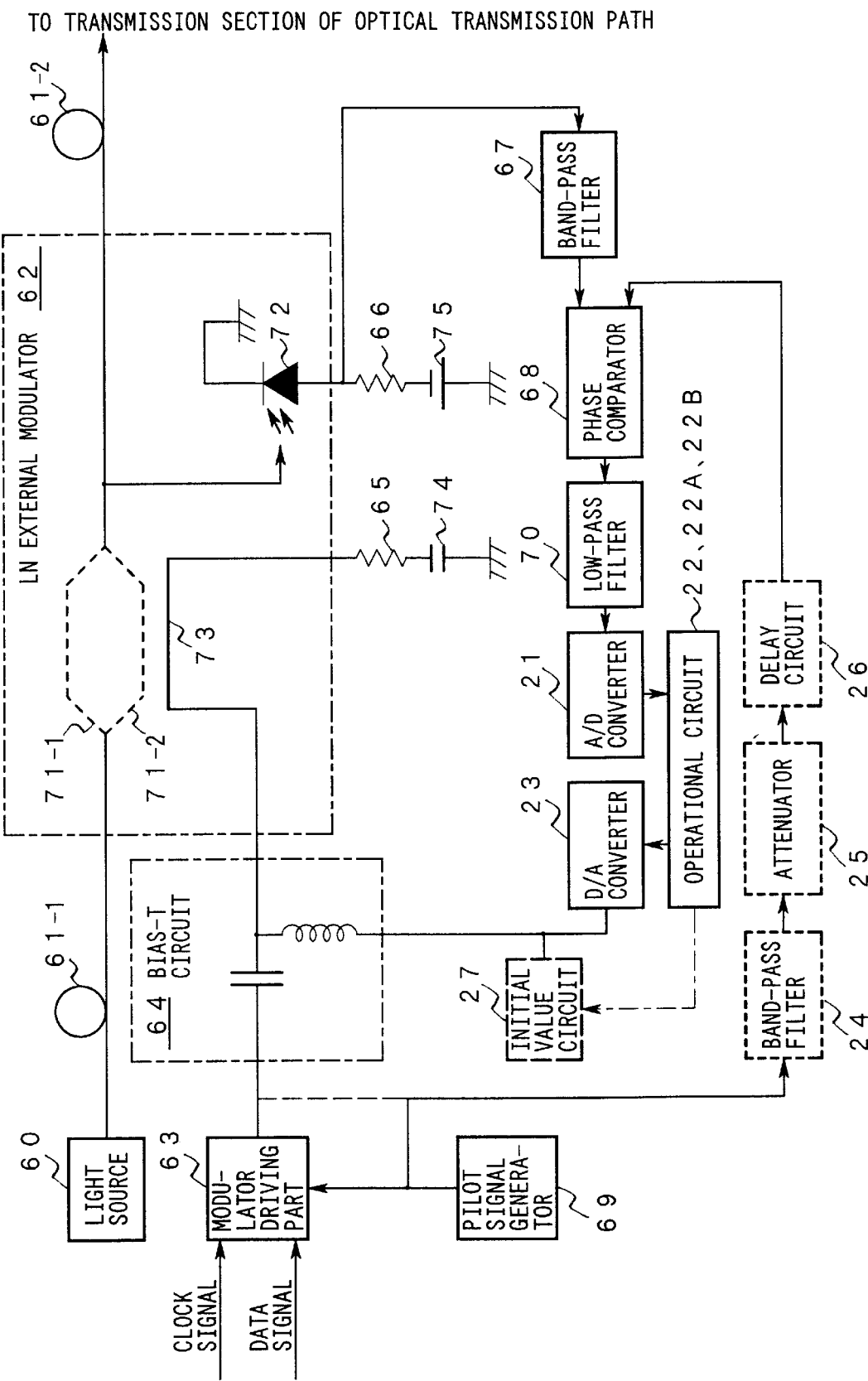
FIG. 2 shows the configuration of each of first to fifth embodiments of the invention.

FIG. 2 shows the configuration of each of first to fifth embodiments of the invention. The components in FIG. 2 having the same function and configuration as the corresponding components in FIG. 6 are given the same reference symbols as the latter and will not be described below.

The first embodiment of the invention will be described below.

The first embodiment is different in configuration from the conventional example of FIG. 6 in that a cascade connection of an A/D converter 21, an operational circuit 22, and a D/A converter 23 are added as the subsequent stage of the low-pass filter 70.

The operation of the first embodiment of the invention will be described below with reference to FIG. 2.

The A/D converter 21 samples instantaneous values of the error signal supplied via the low-pass filter 70 at a frequency that satisfies the sampling theorem to generate a digital signal representing a sequence of the instantaneous values in time-series order.

The operational circuit 22 performs, in real time, integration processing (i.e., exponential smoothing) that is represented by the following recursion formula including a coefficient λ (<1; described later) on an instantaneous value $x_t$ that is given as the above digital signal in time-series order that is represented by t, and thereby suppresses the difference between a particular component and a component having the frequency of the pilot signal that may be superimposed on the error signal as described above:

$$y_t = \lambda x_t + (1-\lambda) y_{t-1}$$

The coefficient λ is set in advance at such a value that the time constant of the low-pass filter that is realized by the above integration processing is larger than the reciprocal of the minimum frequency of the occupied band of the modulating signal even in a state that the waveform of the modulating signal has a maximum allowable sag.

The D/A converter 23 converts, into an analog signal, a digital signal obtained as a result of the integration processing.

With the above measure, the SN ratio of the error signal that is fed back to the LN external modulator 62 via the bias T-circuit 64 is surely improved from that in the conventional example.

Therefore, the LN external modulator 62 operates stably at a proper operating point while flexibly adapting to deviations of the characteristics of the components and a variation in environment even in a low bit rate.

The second embodiment of the invention will be described below.

This embodiment is different in configuration from the first embodiment in that, as indicated by broken lines in FIG. 2, instead of the output of the pilot signal generator 69 the output of the modulator driving part 63 is connected to the second input of the phase comparator 68 via a cascade connection of a band-pass filter 24, an attenuator 25, and a delay circuit 26.

The operation of the second embodiment of the invention will be described below with reference to FIG. 2.

Having a sharp selectivity characteristic in the frequency domain, the band-pass filter 24 extracts, according to the selectivity characteristic, the pilot signal component (described above) that is superimposed on the modulating signal from the components of the modulating signal generated by the modulator driving part 63.

The attenuator 25 adjusts the level of the thus-extracted pilot signal to a level that is suitable for application to the phase comparator 68 via the delay circuit 26.

A delay time D of the delay circuit 26 is set in advance at a value that is given by the following formula for a total propagation delay time Dd of the unit from the output end of the modulator driving part 63 through the bias T-circuit 64 and the LN external modulator 62 to the output end of the band-pass filter 67, a propagation delay time Df of the band-pass filter 24, and a propagation delay time Da of the attenuator 25:

$$D = Dd - Df - Da$$

With the above measure, the phase of the pilot signal that is supplied to the phase comparator 68 as a reference to be used for detecting the phase error of the monitoring signal that is supplied via the band-pass filter 67 is set at such a value that deviations of the characteristics of the bias T-circuit 64, the LN external modulator 62, and the band-pass filter 67 are compensated.

As described above, in this embodiment, deviations of the characteristics of the components are compensated with great exactitude and hence the LN external modulator 62 can operate stably at a proper operating point with high reliability.

In this embodiment, the output of the low-pass filter 70 may be connected to the bias T-circuit 64 without intervention of the A/D converter 21, the operational circuit 22, and the D/A converter 23.

The third embodiment of the invention will be described below.

This embodiment is different in configuration from the first and second embodiments in that, as indicated by a thick broken line in FIG. 2, an initial value circuit 27 is provided whose output is connected, together with the output of the D/A converter 23, to the bias terminal of the bias T-circuit 64.

The operation of the third embodiment of the invention will be described below with reference to FIG. 2.

Only in a predetermined period immediately after startup, the operational circuit 22 performs the above-mentioned integration processing but refrains from outputting a result of the integration processing.

On the other hand, the initial value circuit 27, which is given in advance, as a measured value or a design value, a reference value of the error signal that should be supplied to the LN external modulator 62 via the bias T-circuit 64, supplies, in place of the D/A converter 23, a voltage of the reference value to the bias T-circuit 64 only in the above-mentioned predetermined period.

With the above measure, even in a case where the time constant of the integration processing performed by the operational circuit 22 to adapt to a low bit rate is extremely long, immediately after startup the LN external modulator 62 can transfer quickly to operation at a desirable operating point that is set as corresponding to the above-mentioned reference value.

As described above, in this embodiment, the startup is effected quickly even with a low bit rate and the efficiency of work for maintenance and operation is made high.

In this embodiment, the period when the initial value circuit 27 supplies, in place of the D/A converter 23, the error signal to the bias T-circuit 64 and the period when the operational circuit 22 refrains from outputting the result of the integration processing are set the same in length. The initial value circuit 27 and the operational circuit 22 recognize such a period independently.

However, the invention is not limited to such a configuration. For example, one of the following configurations may be employed:

(1) The operational circuit 22 judges whether the result of the integration processing has reached a stationary value. When the judgment result turns true, as indicated by a chain-line arrow in FIG. 2, the operational circuit 22 requests the initial value circuit 27 to stop the operation of supplying, in place of the D/A converter 23, the error signal to the bias T-circuit 64.

(2) After the above-mentioned predetermined period, the initial value circuit 27 continues to supply the bias T-circuit 64 with the reference instantaneous value of the error signal in the same manner as immediately after startup, the operational circuit 22 outputs the difference between the result of the integration processing and the reference instantaneous value, and the sum of those values are fed back to the LN external modulator 62 via the bias T-circuit 64.

The fourth embodiment of the invention will be described below.

This embodiment is differently configured from the third embodiment in that an operational circuit 22A is provided in place of the above-described operational circuit 22.

The operation of the fourth embodiment of the invention will be described below with reference to FIG. 2.

Only in a predetermined period immediately after startup, the operational circuit 22A repeatedly performs the integration processing according to the above-described recursion formula at a much shorter cycle than in a stationary state.

With the above measure, the time constant that is obtained by the integration processing is shortened only in the above-mentioned predetermined period immediately after startup, the result of the integration processing converges in the predetermined period to a value that is approximately equal to a value that will be obtained in a stationary state.

Therefore, in this embodiment, even in a case where the time constant of the integration processing that is performed by the operational circuit 22A is extremely long due to the fact that a desired bit rate is low, startup is effected quickly without the need for altering the hardware configuration to a large extent.

In this embodiment, the operational circuit 22A repeatedly performs the integration processing at a much shorter cycle than in a stationary state only in the above-mentioned predetermined period. However, the invention is not limited to such a configuration. For example, the startup may be made more efficient by updating the cycle at which the integration processing should be performed independently to a value for the stationary period when the operational circuit 22A recognizes that the result of the integration processing has reached a stationary value with a desired degree of accuracy.

In this embodiment, the cycle of the clock signal to be supplied to both of the A/D converter 21 and the D/A converter 23 is set constant. However, in the above-mentioned predetermined period, the startup may be made more efficient and the transition to a stationary operation state may be made more smoother by setting shorter the cycle of a clock signal to be supplied to one or both of the A/D converter 21 and the D/A converter 23 and by the operational circuit 22A performing the integration processing in synchronization with such a clock signal.

The fifth embodiment of the invention will be described below.

This embodiment is differently configured from the fourth embodiment in that an operational circuit 22B is provided in place of the above-described operational circuit 22A.

The operation of the fifth embodiment of the invention will be described below with reference to FIG. 2.

Only in a predetermined period immediately after startup, the operational circuit 22B performs the integration processing according to the above-described recursion formula in one of the following forms:

Setting all or part of the word lengths of the operands at a small value, that is, the coefficient $\lambda$, the latest instantaneous value $x_t$, and the integration value $y_t$ that was obtained in advance.

Setting the coefficient $\lambda$ at a small value.

Setting the number of terms of the recursion formula at a small value according to which the integration processing is performed. (This applied to only a case where in a stationary state the integration processing is a calculating operation the sum of products of a plurality of terms that are integration results $y_{t-1}, y_{t-2}, \ldots$ that were obtained in advance in time-series order.

In other words, the time constant obtained by the integration processing of the operational circuit 22B is shortened only in the above-mentioned predetermined period immediately after startup and hence the result of the integration processing converges in the predetermined period to a value approximately equal to a value that will be obtained in a stationary state.

Therefore, in this embodiment, even in a case where the time constant of the integration processing that is performed by the operational circuit 22B is extremely long due to the fact that a desired bit rate is low, startup is effected quickly without the need for altering the hardware configuration to a large extent.

In this embodiment, the operational circuit 22B performs the integration processing in the above-described form only in the above-mentioned predetermined period. However, the invention is not limited to such a configuration. For example, the startup may be made more efficient in such a manner that the operational circuit 22B independently updates the form of integration processing to the form for the stationary state when it recognizes that the result of the integration processing has reached a stationary value with a desired degree of accuracy.

In this embodiment, the cycle of the clock signal to be supplied to both of the A/D converter 21 and the D/A converter 23 is kept constant. However, in the above-mentioned predetermined period, the startup may be made more efficient and the transition to a stationary operation state may be made more smoother by setting shorter the cycle of a clock signal to be supplied to one or both of the A/D converter 21 and the D/A converter 23 and by the operational circuit 22B's performing the integration processing in synchronization with such a clock signal.

Figure 3:
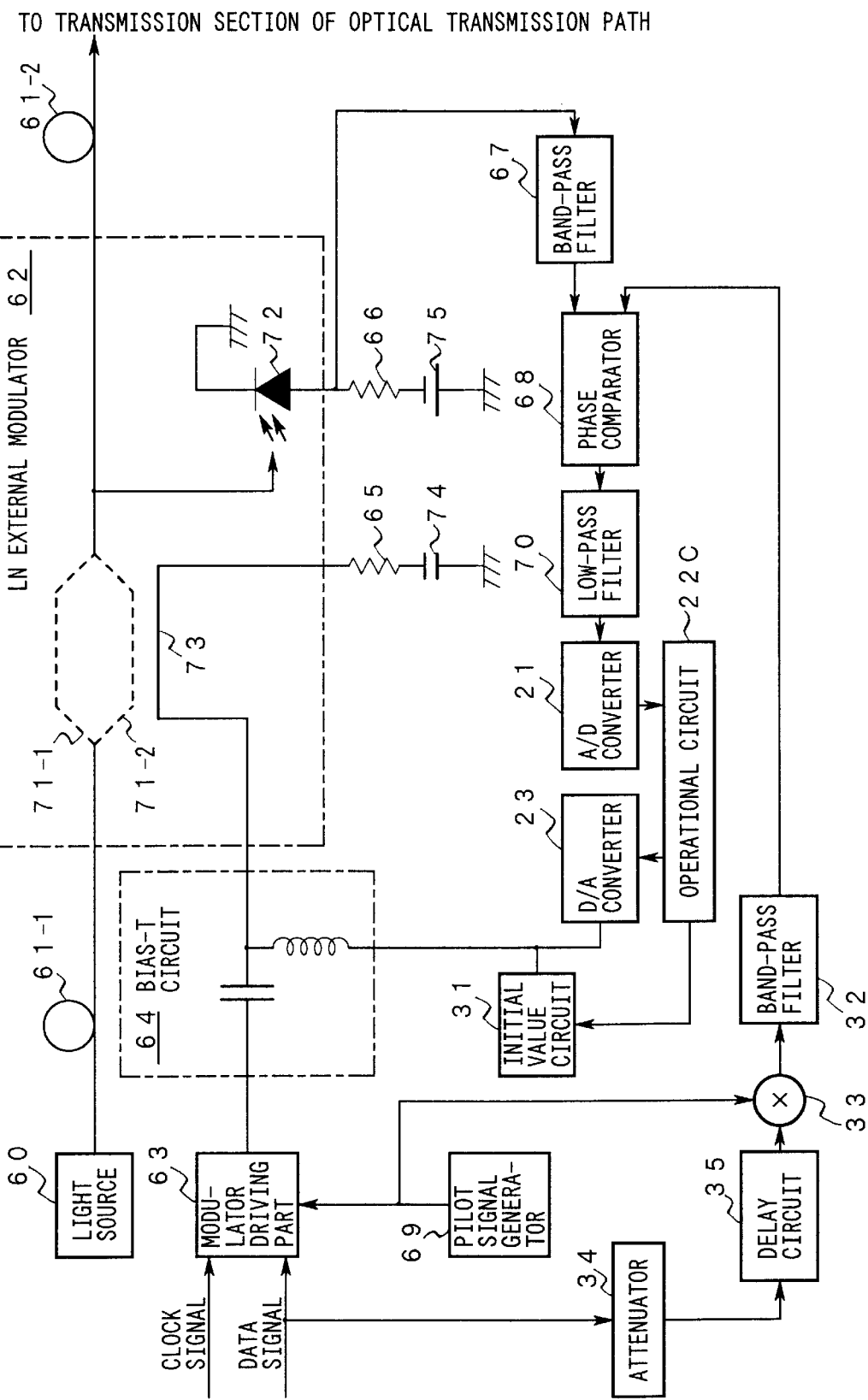
FIG. 3 shows the configuration of a sixth embodiment of the invention.
Figure 4:
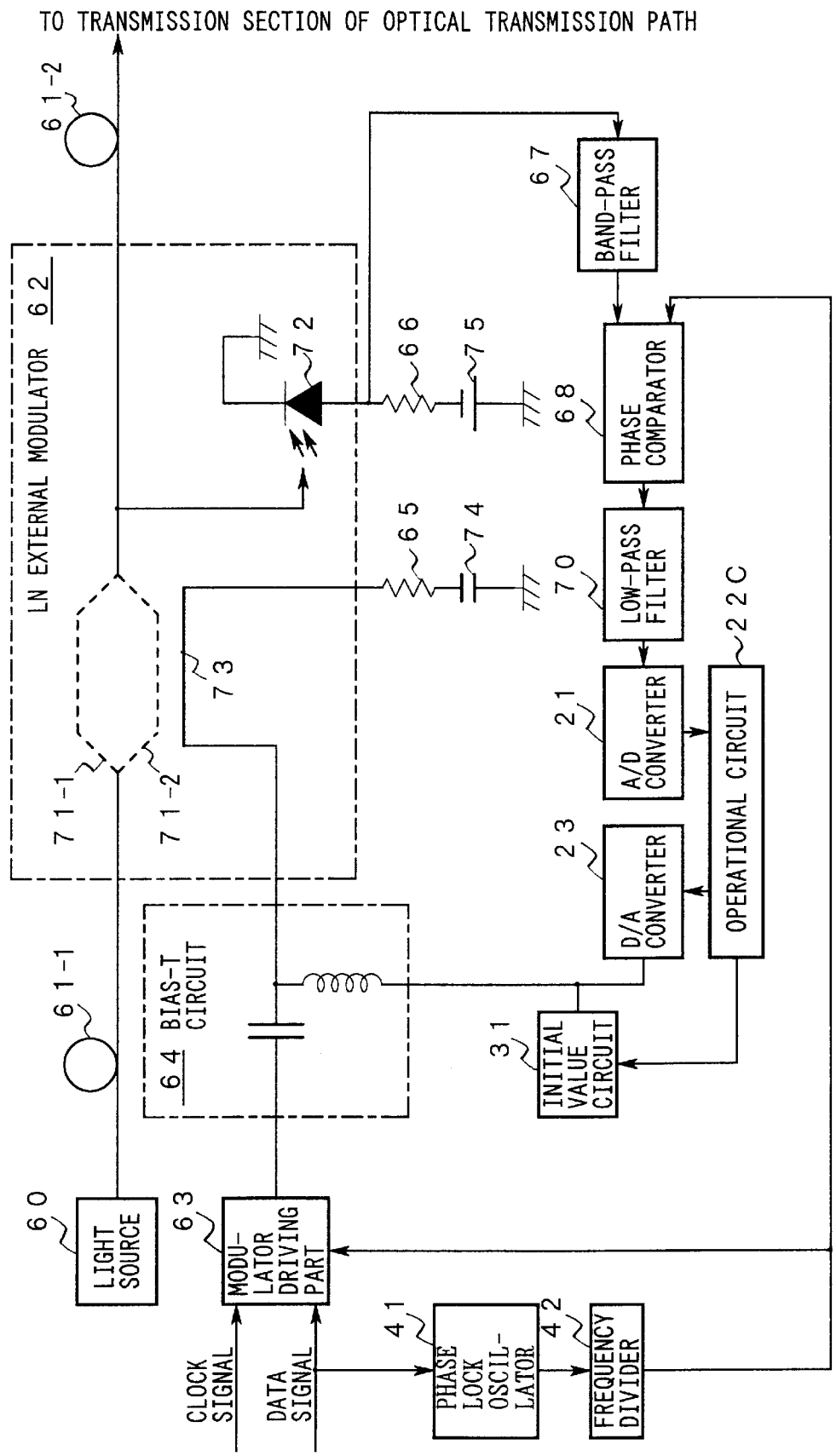
FIGS. 4 and 5 show the configurations of two respective modifications of the sixth embodiment.

FIG. 3 shows the configuration of a sixth embodiment of the invention. The components in FIG. 3 having the same function and configuration as the corresponding components in FIG. 2 are given the same reference symbols as the latter and will not be described below.

This embodiment is different in configuration from the first embodiment in that the output of the initial value circuit 31 is directly connected to the bias terminal of the bias T-circuit 64, that an operational circuit 22C having an output that is directly connected to the control input of the initial value circuit 31 is provided in place of the operational circuit 22, that the output of the band-pass filter 32 is directly connected to the second input of the phase comparator 68, that a multiplier 33 to whose one input the output of the pilot signal generator 69 is connected directly is as the prior stage of the band-pass filter 32, and that the data signal is supplied to the other input of the multiplier 33 via a cascade connection of an attenuator 34 and a delay circuit 35.

The operation of the sixth embodiment will be described with reference to FIG. 3.

The attenuator 34 adjusts the level of the data signal to a predetermined level.

The delay circuit 35 delays the data signal by a such a time that the phase of a sine wave to be supplied, as described later, to the phase comparator 68 via the band-pass filter 32 becomes a suitable value.

The multiplier 33 generates a pseudo modulating signal by calculating the product of the data signal as delayed by the delay circuit 35 and the sine wave that is generated by the pilot signal generator 69.

The band-pass filter 32 extracts the component of the above-mentioned sine wave from the components of the pseudo modulating signal and supplies the extracted component to the phase comparator 68.

The above sine wave is different from the pilot signal that is superimposed on the modulating signal generated by the modulator driving part 63 in that the former is synchronized with the data signal rather than the clock signal.

That is, the sine wave that is supplied to the phase comparator 68 as a reference for a phase error of the pilot signal that is supplied from the band-pass filter 67 to the phase comparator 68 is synchronized with the data signal rather than the clock signal.

Therefore, in this embodiment, the error signal is obtained with great exactitude and the operating point of the LN external modulator 62 is kept stable even in a state that the phase difference between the clock signal and the data signal varies.

The configuration of a modification of the sixth embodiment will be described below.

This modification is different from the sixth embodiment of FIG. 3 in that a cascade connection of a phase lock oscillator 41 and a frequency divider 42 is provided in place of the attenuator 34 and the delay circuit 35, that none of the multiplier 33, the band-pass filter 32, and the pilot signal generator 69 are provided, and that the output of the frequency divider 42 is directly connected to the third input of the modulator driving part 63 and the second input of the phase comparator 68.

In this embodiment, the phase lock oscillator 41 generates a reference signal (this may be either a digital signal or an analog signal) that is synchronized with the data signal and whose frequency is an integral multiple of the frequency of the above-mentioned sine wave.

The frequency divider 42 generates a sine wave that is synchronized with the data signal like the sine wave that is obtained at the output end of the band-pass filter 32 in FIG. 3 by frequency-dividing the reference signal, and supplies the generated sine wave to the modulator driving part 63 and the phase comparator 68.

Therefore, in this modification, as in the case of the sixth embodiment of FIG. 3, the error signal is obtained with great exactitude and the operating point of the LN external modulator 62 is kept stable even in a state that the phase difference between the clock signal and the data signal varies.

In this modification, the frequency divider 42 is provided as the subsequent stage of the phase lock oscillator 41. However, the invention is not limited to such a configuration. The frequency divider 42 may be omitted in a case where the above-mentioned sine wave is generated directly with a synthetic ratio that is set in the phase lock oscillator 41.

Where the phase difference between the clock signal and the data signal is so small as to be allowable, the clock signal, for example, may be supplied to the input of the phase lock oscillator 41 in place of the data signal.

Figure 5:
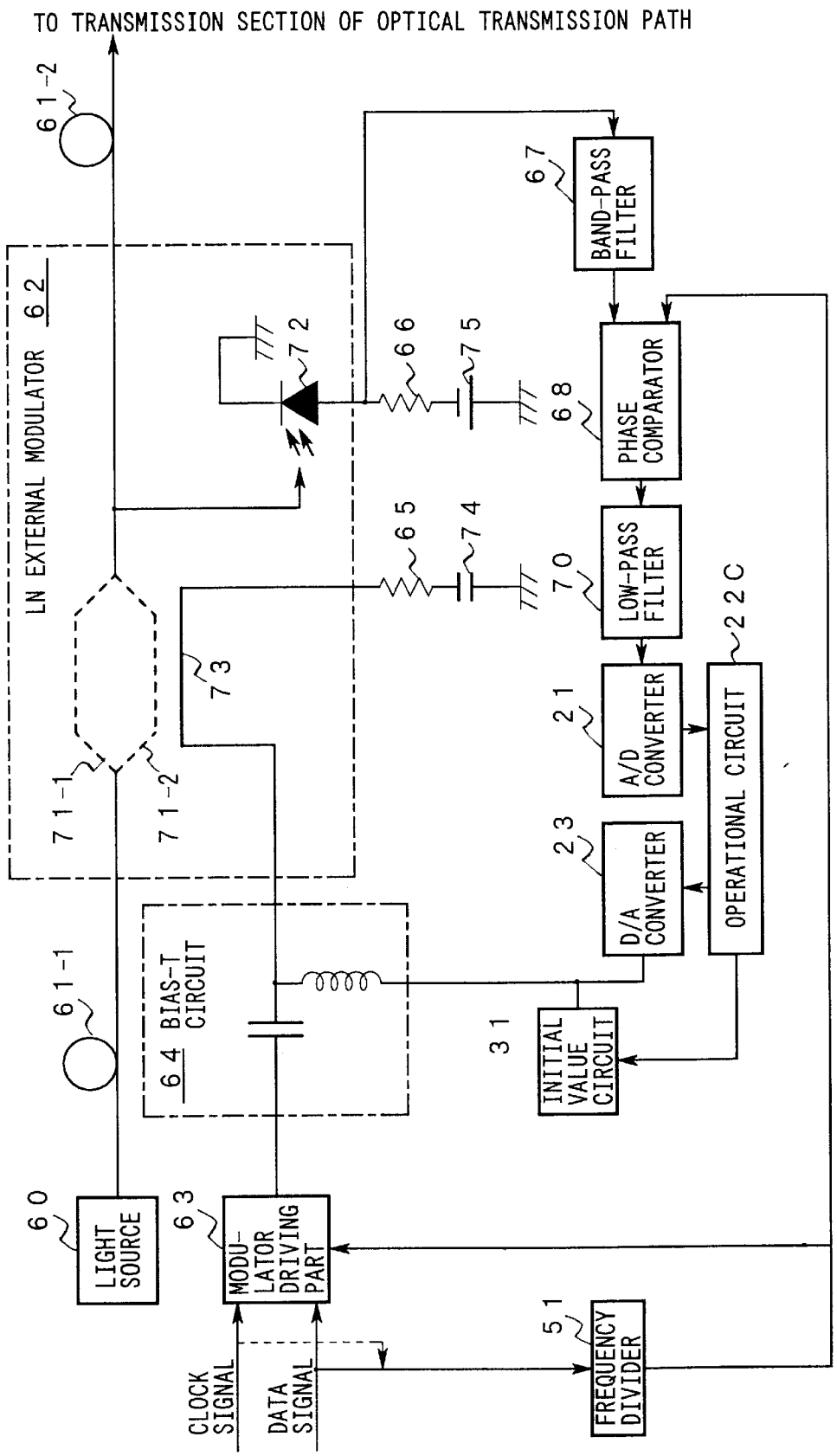

Further, where the phase comparator 68 recognizes the phase difference in the digital domain, a frequency divider 51 may be provided in place of the phase lock oscillator 41 (and the frequency divider 42) as shown in FIG. 5.

In each of the above embodiment and modifications, each of the operational circuits 22 and 22A to 22C performs the first-order integration processing of the exponential smoothing method according the above-described recursion formula.

However, in the invention, the method of the integration processing is not limited to the exponential smoothing method. For example, integration processing of the moving average method may be performed as long as the above-described time constant and frequency characteristic are obtained.

The number of terms to become operands in such integration processing and the values of weights (coefficients) by which the respective terms should be multiplied may be any values as long as the above-described time constant and frequency characteristic are obtained.

In each of the above embodiments and modifications, the above-described integration processing is performed by the operational circuits 22 and 22A to 22C, each of which is a dedicated digital circuit.

However, all or part of the integration process may be implemented by an analog operational circuit or stored logic in which a DSP or some other processor executes a predetermined program as long as the operating point of the LN external modulator 62 is kept stable with a desired degree of accuracy.

In each of the above embodiments and modifications, the invention is applied to the transmitting part that is provided in a node apparatus of an optical transmission system.

However, the application range of the invention is not limited to such a transmitting part. For example, the invention can similarly be applied to a measuring part that is used for testing or evaluating a transmitting system that is required to perform modulation processing accurately according to a desired modulating signal.

In each of the above embodiments and modifications, the invention is applied to the modulation controlling circuit for keeping the operating point of the LN external modulator 62 at a proper point in a stable manner.

However, the application range of the invention is not limited to such an LN external modulator 62. The invention can be applied to any external modulator as long as the luminance of an optical signal that is output in accordance with the instantaneous value of a modulating signal is represented by a periodic function of the instantaneous value, as in the case of the LN external modulator 62.

In each of the above embodiments and modifications, each of the operational circuits 22 and 22A to 22C performs the above-described integration processing and thereby operates as a low-pass filter.

However, in the invention, the processing performed by each of the operational circuits 22 and 22A to 22C is not limited to such integration processing. For example, as indicated by a broken line in FIG. 9B, it may be filtering processing that realizes a notch filter having a sharp attenuation pole at a noise frequency that is located in the vicinity of the error signal in the passband of the low-pass filter 70.

The invention is not limited to the above embodiments and various modifications may be made without departing from the spirit and the scope of the invention. Any improvement may be made in part or all of the components.

What is claimed is:

1. A modulation controlling circuit comprising:
   a phase difference detecting unit for detecting a phase difference between a first pilot signal superimposed or to be superimposed on a modulating signal and a second pilot signal superimposed on an optical signal output from an external modulator according to the modulating signal;
   a controlling unit for feeding back said phase difference to said external modulator to keep an operating point of said external modulator at a point where said phase difference is suppressed; and
   a filtering unit provided in a feedback path wherein said feeding back is performed, for suppressing components of said modulating signal that may exist in a passband of the feedback path according to turbulence of waveforms of said modulating signal.

2. A modulation controlling circuit comprising:

a phase difference detecting unit for detecting a phase difference between a first pilot signal superimposed or to be superimposed on a modulating signal and a second pilot signal superimposed on an optical signal output from an external modulator according to the modulating signal;

a reference operating point setting unit for setting an approximate operating point of said external modulator at a reference operating point;

a controlling unit for feeding back, to said external modulator, a difference between said phase difference and a reference phase difference corresponding to said reference operating point to keep an operating point of said external modulator at a point where said phase difference is suppressed; and a filtering unit provided in a feedback path where said feed back is performed, for suppressing components of said modulating signal that may exist in a passband of the feedback path according to turbulence of waveforms of said modulating signal, and wherein said controlling unit refrains from feeding back said difference to said external modulator until starting a stationary operation at its startup.

3. The modulation controlling circuit according to claim 1, wherein said filtering unit has a cut-off frequency set at a value lower than a minimum frequency in an occupied band of said modulating signal and a passband set lower than the cut-off frequency.

4. The modulation controlling circuit according to claim 2, wherein said filtering unit has a cut-off frequency set at a value lower than a minimum frequency in an occupied band of said modulating signal and a passband set lower than the cut-off frequency.

5. The modulation controlling circuit according to claim 1, wherein said filtering unit suppresses components that may exist in the passband of said feedback path when a length of period where a logical value of said modulating signal can be kept at a constant value is at maximum.

6. The modulation controlling circuit according to claim 2, wherein said filtering unit suppresses components that may exist in the passband of said feedback path when a length of period where a logical value of said modulating signal can be kept at a constant value is at maximum.

7. The modulation controlling circuit according to claim 1, wherein said filtering unit has such a wide passband that it is possible to maintain an operating point by feedback via said feedback path at a maximum variation speed of the operating point of said external modulator.

8. The modulation controlling circuit according to claim 2, wherein said filtering unit has such a wide passband that it is possible to maintain an operating point by feedback via said feedback path at a maximum variation speed of the operating point of said external modulator.

9. The modulation controlling circuit according to claim 1, wherein said filtering unit is constituted as a non-recursive digital filter.

10. The modulation controlling circuit according to claim 2, wherein said filtering unit is constituted as a non-recursive digital filter.

11. The modulation controlling circuit according to claim 1, further comprising an initial-operating-point setting unit for keeping an operating point of said external modulator at an operating point where a reference phase difference in replace of a phase difference to be fed back by said controlling unit is suppressed, until said controlling unit starts a stationary operation at its startup, and wherein said controlling unit refrains from feeding back said phase difference to said external modulator until starting said stationary operation at said startup.

12. The modulation controlling circuit according to claim 1, wherein said controlling unit sets a time constant of said feedback path at a small value within a predetermined period at said startup.

13. The modulation controlling circuit according to claim 2, wherein said controlling unit sets a time constant of said feedback path at a small value within a predetermined period at said startup.

14. The modulation controlling circuit according to claim 12, wherein:

said filtering unit performs filtering in a digital domain; and said controlling unit sets an interval at a small value in time series to be a reference of said filtering, within a predetermined period at said startup.

15. The modulation controlling circuit according to claim 13, wherein:

said filtering unit performs filtering in a digital domain; and said controlling unit sets an interval at a small value in time series to be a reference of said filtering, within a predetermined period at said startup.

16. The modulation controlling circuit according to claim 12, wherein:

said filtering unit performs filtering in a digital domain; and said controlling unit sets one or both of the number of operands and a precision of the operands at a small value within a predetermined period at said startup.

17. The modulation controlling circuit according to claim 13, wherein:

said filtering unit performs filtering in a digital domain; and said controlling unit sets one or both of the number of operands and a precision of the operands at a small value within a predetermined period at said startup.

18. The modulation controlling circuit according to claim 1, further comprising:

a pilot signal generating unit for generating said first pilot signal in synchronization with a sequence of transmission information; and a modulator driving unit for generating said modulating signal by multiplying said sequence of transmission information by a predetermined bit string, and superimposing said first pilot signal as the result product to supply the generated modulating signal to said phase difference detecting unit and said external modulator.

* * * * *